(12) United States Patent  
Nishioka

(10) Patent No.: US 9,277,042 B2  
(45) Date of Patent: Mar. 1, 2016

(54) WIRELESS COMMUNICATION APPARATUS, WIRELESS COMMUNICATION METHOD, AND WIRELESS COMMUNICATION CONTROL PROGRAM

(71) Applicant: Panasonic Corporation, Osaka (JP)

(72) Inventor: Shinichiro Nishioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 165 days.

(21) Appl. No.: 14/117,059

(22) PCT Filed: Mar. 1, 2013

(86) PCT No.: PCT/JP2013/001260  
§ 371 (c)(1),  
(2) Date: Nov. 12, 2013

(87) PCT Pub. No.: WO2013/136702  
PCT Pub. Date: Sep. 19, 2013

(65) Prior Publication Data  
US 2014/0295759 A1   Oct. 2, 2014

(30) Foreign Application Priority Data

Mar. 12, 2012  (JP) ................................ 2012-054276

(51) Int. Cl.  
*H04B 7/00* (2006.01)  
*H04M 1/725* (2006.01)

(52) U.S. Cl.  
CPC ........ *H04M 1/7253* (2013.01); *H04M 2250/52* (2013.01)

(58) Field of Classification Search  
CPC ........... H04B 10/1125; H04B 10/1149; H04B 10/11; H04B 10/25752  
USPC ............... 455/151.2, 41.2; 398/118, 128, 132  
See application file for complete search history.

(56) References Cited

U.S. PATENT DOCUMENTS

| | | | |
|---|---|---|---|
| 2010/0070173 A1* | 3/2010 | Sakamoto | ................... 701/209 |
| 2010/0317332 A1 | 12/2010 | Bathiche et al. | |
| 2011/0170742 A1 | 7/2011 | Fukuchi et al. | |
| 2013/0064429 A1 | 3/2013 | Fukuchi et al. | |

(Continued)

FOREIGN PATENT DOCUMENTS

| | | |
|---|---|---|
| CN | 102129290 A | 7/2011 |
| CN | 102498725 A | 6/2012 |
| JP | 2007-174166 A | 7/2007 |
| JP | 2011-096102 A | 5/2011 |
| JP | 2011-097167 A | 5/2011 |

(Continued)

OTHER PUBLICATIONS

International Search Report for Application No. PCT/JP2013/001260 dated May 7, 2013.

*Primary Examiner* — Sonny Trinh  
(74) *Attorney, Agent, or Firm* — Pearne & Gordon LLP

(57) ABSTRACT

Provided is a wireless communication apparatus wherein when a wireless communication having high directivity is performed together with another wireless communication apparatus, the user can clearly recognize a communicatable range of the wireless communication. In this apparatus, a periphery image capturing unit (110) captures a periphery image through the optical system in such a manner that the line-of-sight of wireless communication for establishing a wireless communication having high directivity is coincident with the optical axis of the optical system. A preview display unit (120) displays, in a preview window, another wireless communication apparatus image-captured as a periphery image. A communication establishing unit (130) establishes the wireless communication with the other wireless communication apparatus displayed in the preview window.

10 Claims, 12 Drawing Sheets

(56) References Cited

U.S. PATENT DOCUMENTS

2013/0141567 A1* 6/2013 Walker et al. ............ 348/135
2014/0161466 A1* 6/2014 Riza ........................ 398/119

FOREIGN PATENT DOCUMENTS

| JP | 2011-146796 A | 7/2011 |
| WO | 2010/144532 A2 | 12/2010 |

* cited by examiner

WIRELESS COMMUNICATION APPARATUS, WIRELESS COMMUNICATION METHOD, AND WIRELESS COMMUNICATION CONTROL PROGRAM

TECHNICAL FIELD

The present invention relates to a radio communication apparatus, a radio communication method, and a radio communication control program which perform transmission and reception of data with other radio communication apparatuses.

BACKGROUND ART

For example, radio communication apparatuses capable of performing transmission and reception of content data such as moving images and still images with other radio communication apparatuses using radio communication have been widespread. This enables services such as content transfer using Digital Living Network Alliance (DLNA) and video streaming using Wi-Fi display.

With the spread of services described above, a technology has been developed which allows for a radio communication apparatus to select another radio communication apparatus as a communication counterpart.

Patent Literature (hereinafter, abbreviated as "PTL") 1 discloses an example of the above technology. In the technology of PTL 1, a user flicks his or her finger on a touch panel of a radio communication apparatus with his or her finger in a direction of another radio communication apparatus with which the user hopes to communicate as a communication counterpart. This allows the radio communication apparatus operated by the user to establish radio communication with the other radio communication apparatus present in the direction in which the user flicked the finger on the touch panel. In other words, according to the technology of PTL 1, the user can select another radio communication apparatus as a communication counterpart by performing an intuitive operation, namely, flicking a finger.

CITATION LIST

Patent Literature

PTL 1
Japanese Patent Application Laid-Open No. 2011-096102

SUMMARY OF INVENTION

Technical Problem

However, when the technology of PTL 1 is applied to highly directional radio communication such as millimeter-wave communication using, for example, 60 GHz band, the communicable range of the radio communication is limited, and the user cannot clearly recognize the range. For this reason, there arise the following problems in this case.

Firstly, one of the problems is that, when there are a plurality of radio communication apparatuses that can be communication counterparts in the same direction, the user cannot surely select a desired apparatus with the flick operation using the finger. Further, the other problem is that even if the user can select the communication counterpart, when the user moves the radio communication apparatus being operated by the user to the outside of the range, the radio communication is interrupted.

An object of the present invention is to allow a user to clearly recognize a communicable range of radio communication when the user performs highly directional radio communication with a different radio communication apparatus.

Solution to Problem

A radio communication apparatus according to an aspect of the present invention includes: a peripheral-area imaging section that captures an image of a peripheral area using an optical system in a state where a line of sight of radio communication for establishing highly directional radio communication is aligned to an optical axis of the optical system; a preview display section that displays, on a preview screen, another radio communication apparatus whose image has been captured as an image of the peripheral area; and a communication establishing section that establishes the radio communication with the other radio communication apparatus displayed on the preview screen.

A radio communication method according to an aspect of the present invention includes: capturing an image of a peripheral area using an optical system in a state where a line of sight of radio communication for establishing highly directional radio communication is aligned to an optical axis of the optical system; displaying, on a preview screen, a different radio communication apparatus whose image has been captured as an image of the peripheral area; and establishing the radio communication with the other radio communication apparatus displayed on the preview screen.

A radio communication control program according to an aspect of the present invention is a program causing a computer of a radio communication apparatus to execute processes including: capturing an image of a peripheral area using an optical system in a state where a line of sight of radio communication for establishing highly directional radio communication is aligned to an optical axis of the optical system; displaying, on a preview screen, another radio communication apparatus whose image has been captured as an image of the peripheral area; and establishing the radio communication with the other radio communication apparatus displayed on the preview screen.

Advantageous Effects of Invention

According to the present invention, a user can clearly recognize a communicable range of radio communication when performing highly directional radio communication with a different radio communication apparatus.

DESCRIPTION OF EMBODIMENTS

Embodiments of the present invention will be described in detail hereinbelow with reference to the accompanying drawings.

Embodiment 1

Embodiment 1 will be described.

Figure 1:
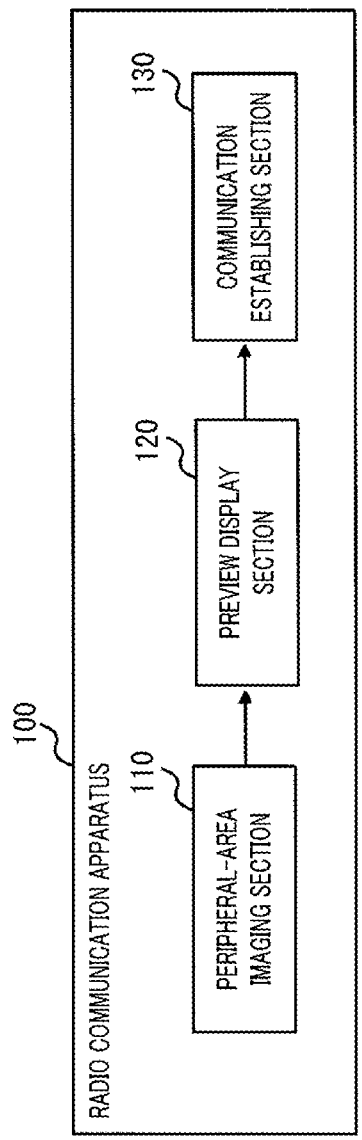
FIG. 1 is a block diagram illustrating a configuration example of functions realized by a radio communication apparatus according to Embodiment 1.

Each function of radio communication apparatus 100 according to the present embodiment will be described with reference to FIG. 1.

Radio communication apparatus 100 includes peripheral-area imaging section 110, preview display section 120, and communication establishing section 130.

Peripheral-area imaging section 110 captures an image of a peripheral area of radio communication apparatus 100 using the optical system in a state where a line of sight (LOS) of radio communication for establishing highly directional radio communication is aligned to an optical axis of an optical system.

Preview display section 120 displays on a preview screen another radio communication apparatus whose image has been captured as an image of the peripheral area.

Communication establishing section 130 establishes radio communication with another radio communication apparatus displayed on the preview screen.

With radio communication apparatus 100, the user captures an image of another radio communication apparatus in such a manner that the image falls within the preview screen, and thus can intuitively select the radio communication apparatus as a communication counterpart and thus can attempt to establish radio communication. Further, in radio communication apparatus 100, the user captures the image of another radio communication apparatus in such a manner that the image falls within the preview screen and thus can intuitively maintain the established radio communication. In other words, in radio communication apparatus 100, the user captures an image of another radio communication apparatus in such a manner that the image falls within the preview screen, so that the user can clearly recognize the communicable range of the radio communication. As a result, the user can more surely realize the selection of communication counterpart and the establishment of radio communication with an intuitive operation.

Embodiment 2

Embodiment 2 will be described.

<Configuration of Radio Communication Apparatus 100>

First, a hardware configuration of radio communication apparatus 100 according to the present embodiment will be described with reference to FIG. 2.

Figure 2:
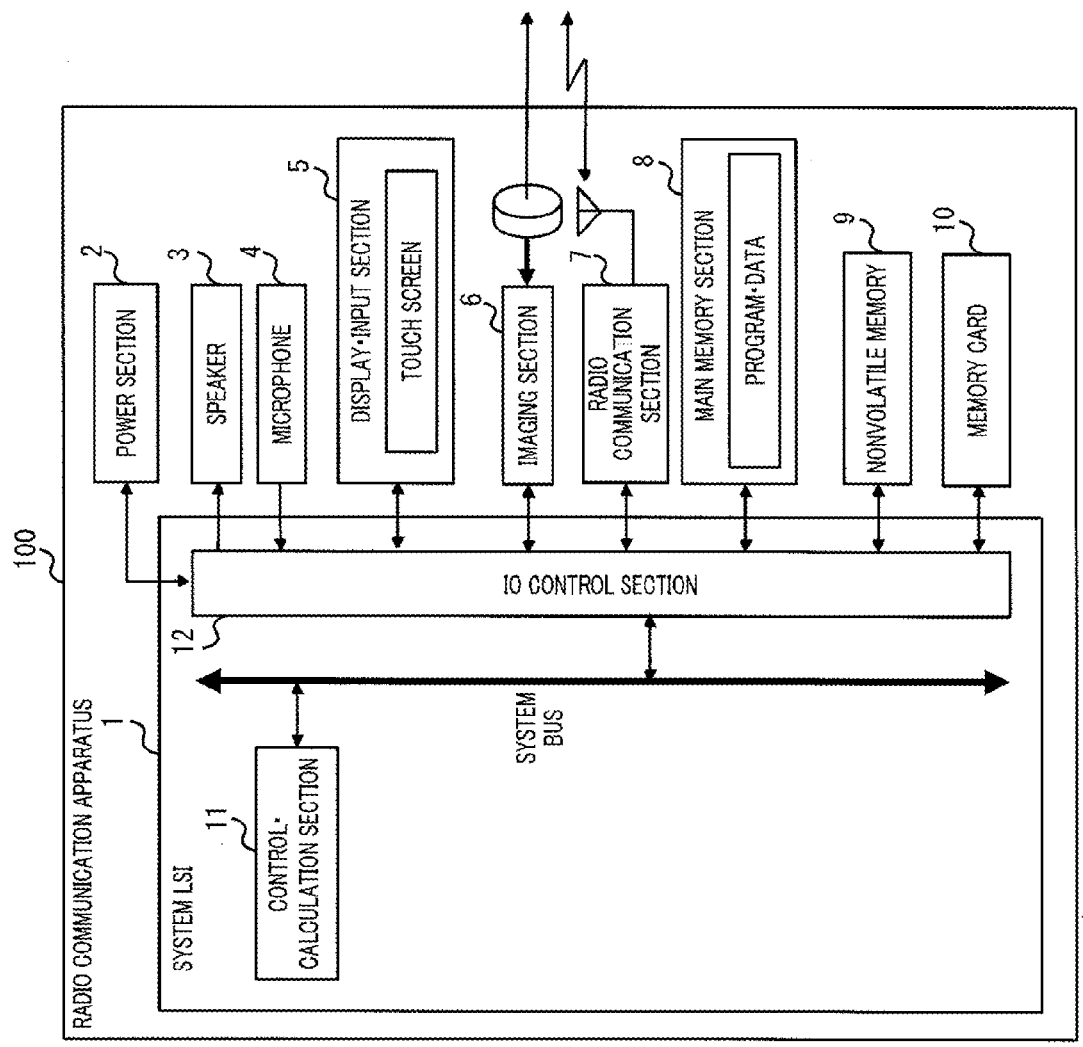
FIG. 2 is a block diagram illustrating a configuration example of hardware included in a radio communication apparatus according to Embodiment 2.

In FIG. 2, radio communication apparatus 100 according to the present embodiment is an information processing terminal which enables radio communication with another radio communication apparatus. In addition, radio communication used in the present embodiment is highly directional radio communication such as a millimeter-wave communication using, for example, 60 GHz band. Further, another radio communication apparatus as a communication counterpart of radio communication apparatus 100 is hereinafter referred to as "peripheral apparatus."

As shown in FIG. 2, radio communication apparatus 100 includes system LSI (Large Scale Integration) 1, power section 2, speaker 3, microphone 4, display and•input section 5, imaging section 6, radio communication section 7, main memory section 8, memory 9, and memory card 10.

System LSI 1 includes control•calculation section 11 and input and output (IO) control section 12. Control and calculation section 11 performs input and output of data with IO control section 12 through a system bus. Then, control•calculation section 11 performs calculations based on input data and outputs data obtained from the calculation result so as to perform various controls of radio communication apparatus 100. Examples of control•calculation section 11 include a central processing unit (CPU). IO controller 12 relays the input and output of data between control calculation section 11 and each of sections 3 to 10.

In addition, system LSI 1 can be classified into an Integrated Circuit (IC), a system LSI, a super LSI, an ultra LSI, or the like depending on an integration degree. Further, system LSI 1 may be realized by a dedicated circuit or a general-purpose processor. Furthermore, system LSI 1 may be a field programmable gate array (FPGA) which is programmable after the LSI is manufactured, or a reconfigurable processor in which connections and settings of circuit cells inside the processor can be reconfigured. Furthermore, the functions integrated by other integrated circuit technologies (for example, biotechnology) according to advancement of a semiconductor technology or technologies derivative therefrom may be applied to radio communication apparatus 100, as a replacement for the system LSI 1.

Power section 2 supplies power to each section through IO control section 12 based on a user's operation so as to turn on the power of radio communication apparatus 100. Further, power section 2 stops the supply of power to each section based on the user's operation so as to turn off the power of radio communication apparatus 100.

Speaker 3 outputs sound to the outside of radio communication apparatus 100. Microphone 4 inputs sound to the inside of radio communication apparatus 100.

Display and input section 5 performs displaying of the image. Further, display•input section 5 receives the user's input operation. In the present embodiment, an example of display•input section 5 is a touch screen (also referred to as a touch panel).

Imaging section 6 captures an image of the outside of radio communication apparatus 100 through the optical system. In the present embodiment, an example of imaging section 6 is a camera.

Figure 3A:
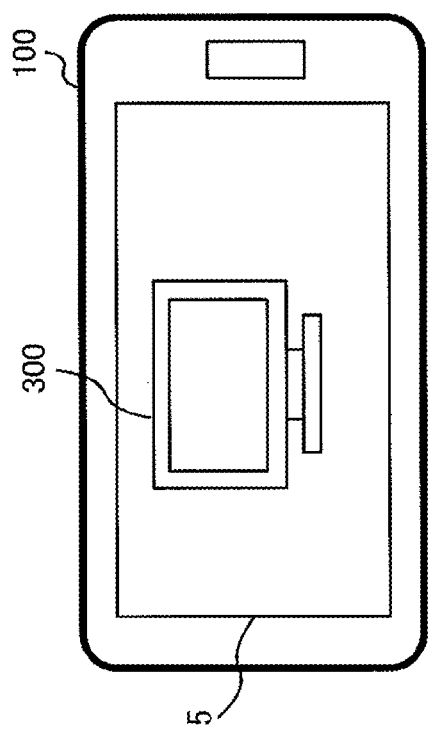
FIGS. 3A and 3B are diagrams respectively illustrating examples of the appearances of front and back sides of the radio communication apparatus according to Embodiment 2.
Figure 3B:
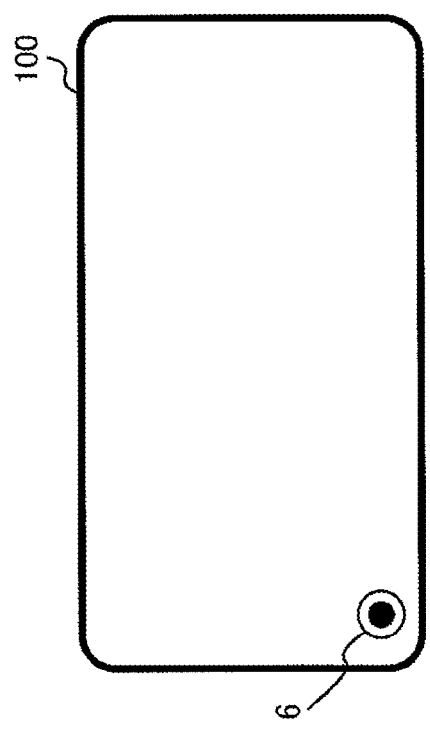

Here, an arrangement example of display•input section 5 and imaging section 6 will be explained. FIGS. 3A and 3B illustrate the appearances of radio communication apparatus 100 when a smart phone or a tablet PC is used as radio communication apparatus 100. As illustrated in FIG. 3A, display•input section 5 is provided on a front side of a case of radio communication apparatus 100. On the other hand, as illustrated in FIG. 3B, imaging section 6 is provided on the back side of a case of radio communication apparatus 100. In addition, hereinafter, a description will be given assuming that radio communication apparatus 100 is the smart phone or tablet PC illustrated in FIGS. 3A and 3B.

Radio communication section 7 establishes highly directional radio communication with a peripheral apparatus and performs data transfer to realize a service using the radio communication with the peripheral apparatus.

Main memory section 8 stores programs to be executed by control•and calculation section 11, and fixed data. Examples of main memory section 8 include a read only memory (ROM).

Nonvolatile memory 9 is a working memory used when control•and calculation section 11 performs calculations. Examples of non-volatile memory 9 include a random access memory (RAM).

Memory card 10 is a storage medium for saving various data. Examples of memory card 10 include an SD, SD high capacity (SDHC) or SD eXtended capacity (SDXC) memory card.

<Each Function of Radio Communication Apparatus 100>

Figure 4:
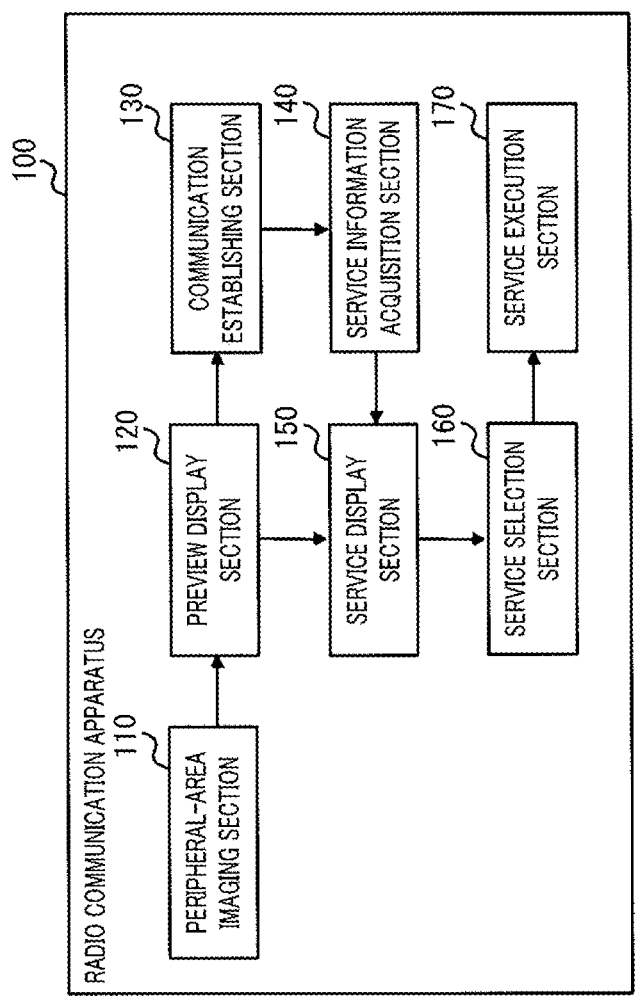
FIG. 4 is a block diagram illustrating a configuration example of functions realized by the radio communication apparatus according to Embodiment 2.

Next, each function of radio communication apparatus 100 realized by the above described hardware configuration will be described with reference to FIG. 4.

Radio communication apparatus 100 includes peripheral-area imaging section 110, preview display section 120, communication establishing section 130, service information acquisition section 140, service display section 150, service selection section 160, and service execution section 170.

Peripheral-area imaging section 110 receives an imaging operation performed by a user, and captures an image of a peripheral apparatus through the optical system in a state where the line of sight of the radio communication for establishing highly directional radio communication is aligned to the optical axis of the optical system. The term "imaging operation" as used herein means not only an operation to start imaging, but also an operation to direct imaging section 6 to the peripheral apparatus and an operation to maintain a state in which imaging section 6 is directed to the peripheral apparatus. In addition, peripheral-area imaging section 110 is realized by imaging section 6 and control•calculation section 11.

Preview display section 120 displays a preview screen of the peripheral apparatus whose image has been captured by the imaging operation performed by a user. The term "displaying a preview screen" means an operation to display in real-time the image captured by peripheral-area imaging section 110, as a screen. Further, a screen displayed when the operation to display a preview screen is performed is called a preview screen. An example of how a preview screen is displayed is illustrated in FIG. 3A. In the example of FIG. 3A, the peripheral apparatus 300 whose image has been captured is displayed on display•input section 5. In addition, preview display section 120 is realized by display•input section 5 and control and calculation section 11. In addition, since stationary devices such as a TV have a power margin, the communication range may be expanded using a plurality of antennas or using a beam steering technique.

When a peripheral apparatus is displayed on the preview screen, communication establishing section 130 attempts to establish radio communication with the peripheral apparatus. Here, if the peripheral apparatus is in standby mode for the radio communication, communication establishing section 130 establishes the radio communication between the peripheral apparatus and radio communication apparatus 100. In contrast, if the peripheral apparatus is not in standby mode for radio communication, communication establishing section 130 does not establish radio communication between the peripheral apparatus and radio communication apparatus 100. Further, while the peripheral apparatus which has established the radio communication continues to be displayed within a predetermined range of the preview screen, communication establishing section 130 maintains the established radio communication. In addition, communication establishing section 130 is realized by radio communication section 7 and control•and calculation section 11.

Figure 5:
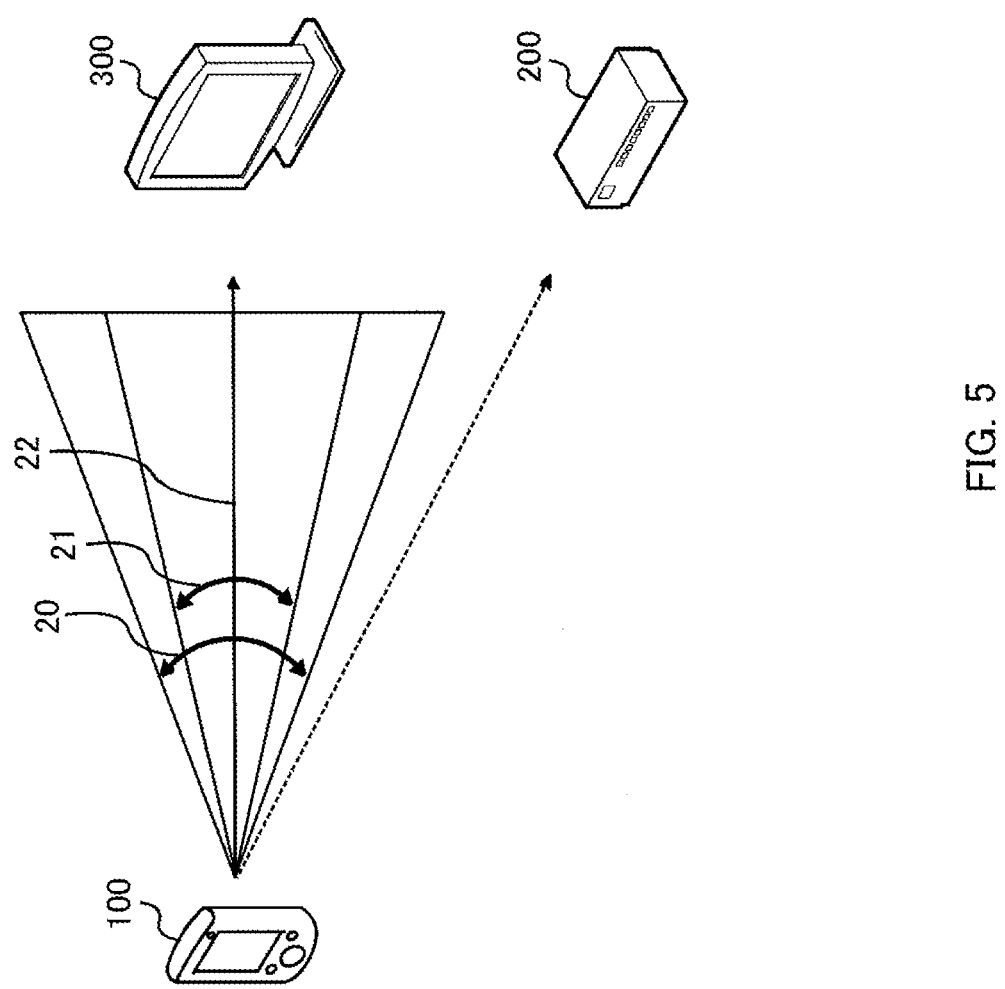
FIG. 5 is a diagram illustrating an image in which radio communication is established between the radio communication apparatus according to Embodiment 2 and peripheral apparatuses.

Here, an example of how radio communication is established will be described with reference to FIG. 5. In FIG. 5, when both peripheral apparatus 200 and peripheral apparatus 300 are in standby mode for radio communication, radio communication apparatus 100 attempts to establish radio communication with peripheral apparatus 300. In this case, optical axis 22 of the optical system of imaging section 6 is directed to peripheral apparatus 300, and because peripheral apparatus 300 falls within the range of view angle 20, peripheral apparatus 300 can be displayed on the preview screen as illustrated in FIG. 3A. Here, it is assumed that the line of sight (LOS) of the radio communication in radio communication section 7 is aligned to optical axis 22 in advance. Thus, peripheral apparatus 300 falls within the range of radio wave radiation angle 21 and is within the LOS of the radio communication, such that the radio communication with radio communication apparatus 100 is established. Thereafter, if peripheral apparatus 300 continues to fall within the range of radio wave radiation angle 21, the established radio communication is maintained. In addition, in FIG. 5, optical axis 22 is not directed to peripheral apparatus 200, and peripheral apparatus 200 does not fall within the range of radio wave radiation angle 21, so that peripheral apparatus 200 is in a none line of sight (NLOS) of the radio communication. Therefore, even if peripheral apparatus 200 in the none line of sight of the radio communication is in standby mode for the radio communication, radio communication is not established between peripheral apparatus 200 and radio communication apparatus 100. In addition, if peripheral apparatus 300 is large, a communication antenna thereof may fall within the range of radio wave radiation angle 21. Further, peripheral apparatus 300 is easily visible when radio wave radiation angle 21 falls within the range of view angle 20, but is not limited to this case.

When radio communication is established with a peripheral apparatus, service information acquisition section 140 acquires service information from the peripheral apparatus through the radio communication. In other words, if the radio communication with radio communication apparatus 100 is established, the peripheral apparatus transmits service information held in advance to radio communication apparatus 100. In addition, service information acquisition section 140 is realized by radio communication section 7 and control•and calculation section 11.

Here, service information will be described. Service information is information indicating associations between services executable by the peripheral apparatus and communication protocols used at the time of executing the services. For example, when file transfer is possible using TCP/IP protocols, the peripheral apparatus holds service information in which the file transfer and the TCP/IP protocol are associated. The number of associations included in the service information may be one or more than one. For example, when a plurality of services are prepared and any one of them is selected to be enabled, the peripheral apparatus holds service information including each association between a service and a communication protocol. Further, for example, when a plurality of communication protocols are prepared for one service and any one of them is selected to be enabled, the peripheral apparatus holds service information including each association between one service and communication protocols.

Service display section 150 creates a service selection display region based on service information acquired by service information acquisition section 140. Then, service display section 150 displays the created service selection display region while overlapping the service selection display region with the preview screen. The service selection display region is a user interface which displays services executable between radio communication apparatus 100 and a peripheral apparatus and causes the user to select a desired service from among the services. Therefore, it is not necessary for the service selection display region to display all services included in the service information. If the service information includes services that are not executable by radio communication apparatus 100, the services are not displayed on the service selection display region. In other words, when the service selection display region is created, first, service display section 150 determines whether associations between services included in the service information and communication protocols are available by radio communication apparatus 100. Next, service display section 150 extracts services from the associations being determined to be available in radio communication apparatus 100, and creates the service selection display region to include the services. In this manner, the service selection display region displays only services executable between radio communication apparatus 100 and the peripheral apparatus. In addition, service display section 150 is realized by display•input section 5 and control and calculation section 11.

Here, an example of the service selection display region will be described with reference to FIGS. 6A and 6B.

Figure 6B:
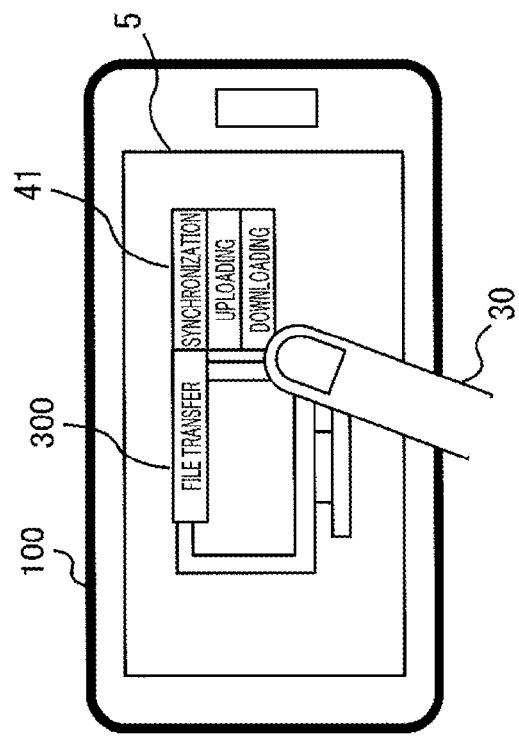
FIGS. 6A and 6B are diagrams respectively illustrating examples of a display screen when a service is selected in the radio communication apparatus according to Embodiment 2.
Figure 6A:
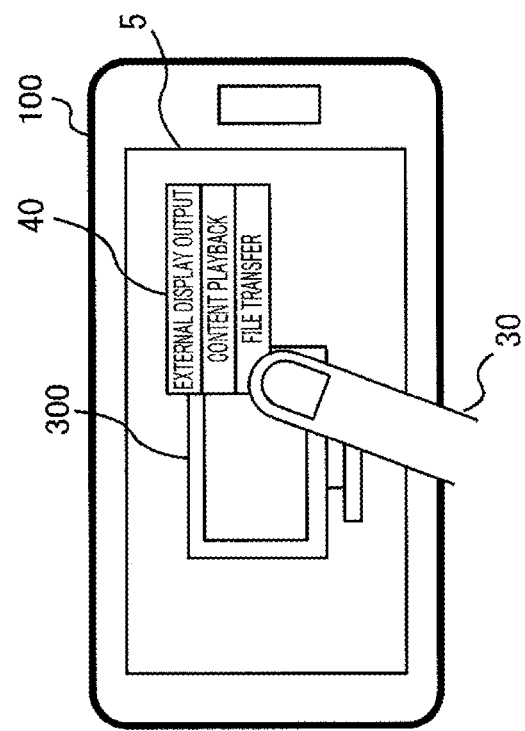

FIG. 6A illustrates an example in which a preview screen is displayed in display•input section 5. As illustrated in FIG. 6A, service selection display region 40 is displayed while being overlapped with the preview screen. Then, an external display output, a content playback, and a file transfer are displayed as three available services on service selection display region 40. The external display output is a service to output the same display screen as the display screen of display•input section 5 of radio communication apparatus 100 to the display section of the peripheral apparatus. The content playback is a service to playback, using radio communication apparatus 100, content data saved in the peripheral apparatus. The file transfer is a service to perform file transfer between radio communication apparatus 100 and a peripheral apparatus. While the user views service selection display region 40, the user touches with the finger a portion in which a desired service is displayed. FIG. 6A illustrates that finger 30 of the user is touching the display region of the file transfer.

In addition, for example, a High-Definition Multimedia Interface (HDMI) protocol is associated with the external display output. Further, each of the content playback and the file transfer is associated with at least one of the TCP/IP protocol, SD protocol, and Universal Serial Bus (USB) protocol. The HDMI protocol, SD protocol, and USB protocol used herein are a Protocol Adaptation Layer (PAL) protocol in which a wired bus protocol is adapted to a Media Access Controller (MAC) layer.

FIG. 6B illustrates an example of how the preview screen is displayed after the user touches the display region of file transfer on the preview screen illustrated in FIG. 6A. As illustrated in FIG. 6B, service selection display region 41 is displayed while being overlapped with the preview screen display region of display•input section 5. Synchronization, uploading, and downloading are displayed as services obtained by further sub-classifying the file transfer on service selection display region 41. The synchronization is a service to synchronize data shared between radio communication apparatus 100 and the peripheral apparatus. The uploading is a service in which radio communication apparatus 100 transmits data held in radio communication apparatus 100, to the peripheral apparatus. The downloading is a service in which radio communication apparatus 100 receives data held in the peripheral apparatus, from the peripheral apparatus. While the user views service selection display region 41, the user touches with the finger a portion in which a desired service is displayed. FIG. 6B illustrates that finger 30 of the user touches the display region of downloading.

In addition, when a plurality of communication protocols are prepared for services executable by radio communication apparatus 100 and the peripheral apparatus, service display section 150 may display a plurality of protocols in the service selection display region so as to allow the user to make a selection.

Service selection section 160 receives a service selection operation for the service selection display region. The service selection operation is an operation in which the user selects a portion of the service selection display region in which a desired service is displayed. The service selection operation is, for example, a touch operation. As described in FIGS. 6A and 6B, if the user touches a desired display portion in the service selection display region, service selection section 160 detects which part is touched. Then, service selection section 160 notifies service execution section 170 of the service corresponding to the detected portion. In addition, service selection section 160 is realized by display•input section 5 and control•calculation section 11.

Service execution section 170 executes the service selected by the service selection operation using the communication protocol associated with the service, based on the service information acquired by service information acquisition section 140. For example, when the selected service is a file transfer, and file transfer is associated with the TCP/IP protocol, service execution section 170 executes a file transfer with the peripheral apparatus using the TCP/IP protocol. In addition, service execution section 170 is realized by radio communication section 7 and control•and calculation section 11.

With radio communication apparatus 100, the user captures an image of a peripheral apparatus in such a manner that the image falls within the preview screen, and thus can intuitively select the peripheral apparatus as a communication counterpart, thereby attempting to establish radio communication. Further, with radio communication apparatus 100, the user captures the image of the peripheral apparatus in such a manner that the image falls within the preview screen and thus can intuitively maintain the established radio communication. Further, in radio communication apparatus 100, the user views the service selection display region and performs an operation to select a desired service and thus can intuitively select a service and a communication protocol which can be executed between the peripheral apparatus and radio communication apparatus 100.

<Operation of Radio Communication Apparatus 100>

Figure 7:
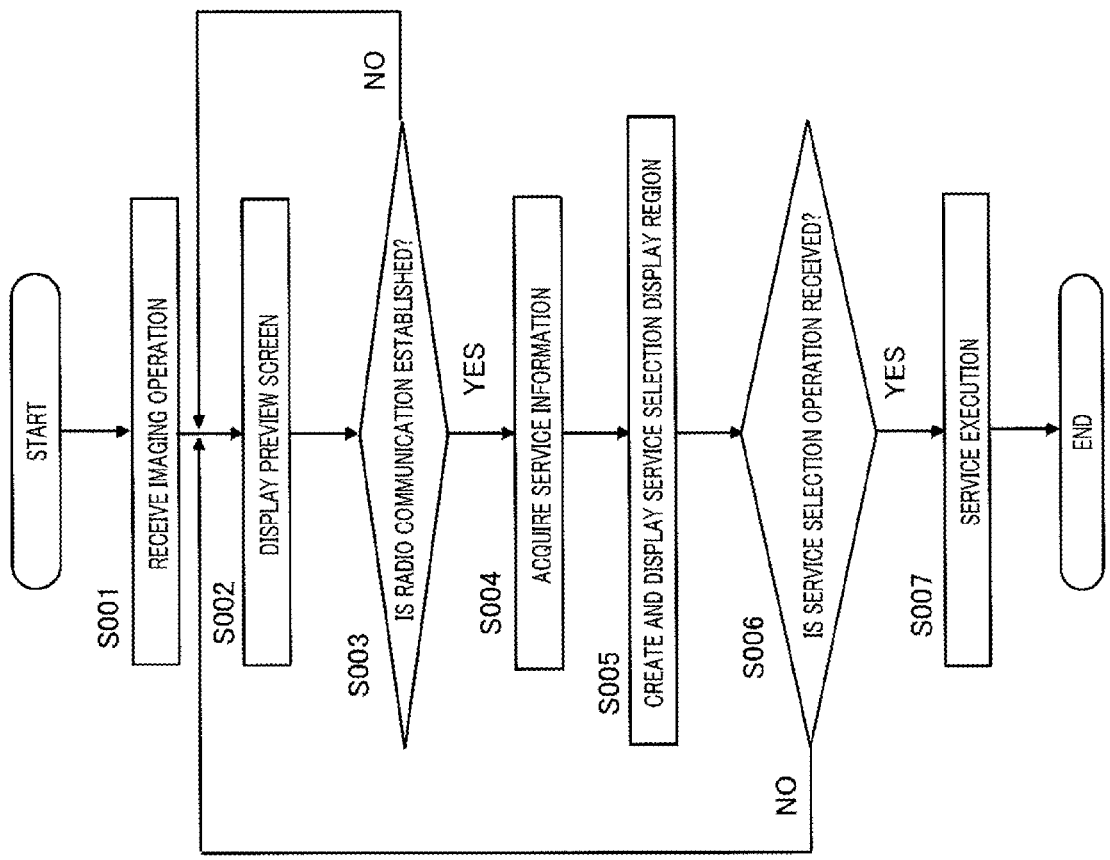
FIG. 7 is a flow chart illustrating an example of operations performed by the radio communication apparatus according to Embodiment 2.

Next, operation examples of radio communication apparatus 100 will be respectively described with reference to FIGS. 7 and 8.

First, FIG. 7 will be described. FIG. 7 is a flowchart illustrating an example of operations of radio communication apparatus 100.

In step S001, peripheral-area imaging section 110 receives an imaging operation performed by a user and starts capturing an image of a peripheral area of radio communication apparatus 100 (S001).

In step S002, preview display section 120 receives the operation to start imaging and display a preview screen. In addition, it is assumed that displaying of the preview screen continues to be performed even in the following steps although the description thereof is omitted in the following steps.

In step S003, if the image of peripheral apparatus is placed within the preview screen by the imaging operation performed by the user, communication establishing section 130 attempts to establish radio communication with the peripheral apparatus displayed on the preview screen.

When the attempt to establish the radio communication fails (S003: NO), communication establishing section 130 returns to step S002. On the other hand, when the attempt to establish the radio communication succeeds (S003: YES), communication establishing section 130 proceeds to step S004.

In step S004, service information acquisition section 140 acquires service information through the radio communication from the peripheral apparatus with which the radio communication is established.

In step S005, service display section 150 creates a service selection display region based on the service information and displays the service selection display region while overlapping the service selection display region with the preview screen.

In step S006, service selection section 160 stands by for the service selection operation. This standby continues for a prescribed period of time, for example.

When the service selection operation is not received during the prescribed period of time (S006: NO), service selection section 160 returns to step S001. At this time, service display section 150 may return the service selection display region to be hidden from the preview screen. For example, the preview screen returns from the state shown in FIG. 6A or FIG. 6B to the state shown in FIG. 3A.

On the other hand, when the service selection operation is received during the prescribed period of time (S006: YES), service selection section 160 proceeds to step S007.

In step S007, service execution section 170 executes the service selected through the service selection operation, with the peripheral apparatus. The communication protocol used at this time is the communication protocol associated with the service selected by the service selection operation, in the service information. In addition, during the time from the execution start of the service to the execution end of the service, service execution section 170 may display, on the preview screen, a message indicating that the service is being executed, a progress bar indicating an execution state of the service, or the like. With the information displayed in the manner described above, the user can recognize that the user needs to continue to capture the image of the peripheral apparatus in such a manner that the image falls within the preview screen, in order to prevent the radio communication from being interrupted.

Next, FIG. 8 will be described. FIG. 8 is a sequence diagram illustrating an example of operations when radio communication apparatus 100 is in a situation where peripheral apparatus 200 and peripheral apparatus 300 can be selected as a communication counterpart as illustrated in FIG. 5. In addition, in FIG. 8, the steps of radio communication apparatus 100 correspond to the steps of the flow described in FIG. 7, and the same reference numerals are given thereto.

First, the user performs the imaging operation to direct imaging section 6 to peripheral apparatus 200 in order to select peripheral apparatus 200 as the communication counterpart. This causes radio communication apparatus 100 to capture an image of peripheral apparatus 200 (S001).

Next, radio communication apparatus 100 displays peripheral apparatus 200 on the preview screen (S002). Then, the user performs the imaging operation while viewing the preview screen.

Next, radio communication apparatus 100 attempts to establish radio communication with peripheral apparatus 200 (S003). Here, it is assumed that peripheral apparatus 200 is not in standby mode for radio communication. Thus, radio communication apparatus 100 fails in the attempt to establish radio communication with peripheral apparatus 200. In this case, since the service selection display region is not displayed on the preview screen, the user can recognize that the attempt to establish radio communication with peripheral apparatus 200 has failed. In addition, radio communication apparatus 100 may display a message indicating that the attempt to establish radio communication with peripheral apparatus 200 has failed.

Here, the user performs the imaging operation to direct imaging section 6 to peripheral apparatus 300 in order to select peripheral apparatus 300 as the communication counterpart. This causes radio communication apparatus 100 to capture an image of peripheral apparatus 300 (S001). At this time, the user captures an image in such a manner that the image of peripheral apparatus 300 falls within the preview screen.

Next, radio communication apparatus 100 displays peripheral apparatus 300 on the preview screen (S002).

Next, radio communication apparatus 100 attempts to establish the radio communication with peripheral apparatus 300 (S003). Here, it is assumed that peripheral apparatus 300 is in standby mode for radio communication. Thus, radio communication apparatus 100 succeeds in the attempt to establish radio communication with peripheral apparatus 300.

Peripheral apparatus 300 transmits the service information held by itself to radio communication apparatus 100 through the radio communication. Then, radio communication apparatus 100 receives the service information from peripheral apparatus 300 (S004). The term "receives" as used herein means "acquires."

Next, radio communication apparatus 100 creates a service selection display region based on the service information and displays the service selection display region while overlapping the service selection display region with the preview screen (S005). In this case, since the service selection display region is displayed on the preview screen, the user can recognize that the attempt to establish the radio communication with peripheral apparatus 300 has succeeded.

The user performs a service selection operation in order to select a desired service from among services displayed in the service selection display region. In other words, the user touches a portion of the service selection display region in which the desired service is displayed.

Radio communication apparatus 100 receives the service selection operation performed by the user, that is, receives the touch operation (S006).

Radio communication apparatus 100 executes the service selected through the service selection operation, with the peripheral apparatus 300 (S007). The communication protocol used for executing the service corresponds to the communication protocol associated with the selected service, in the service information.

Figure 8:
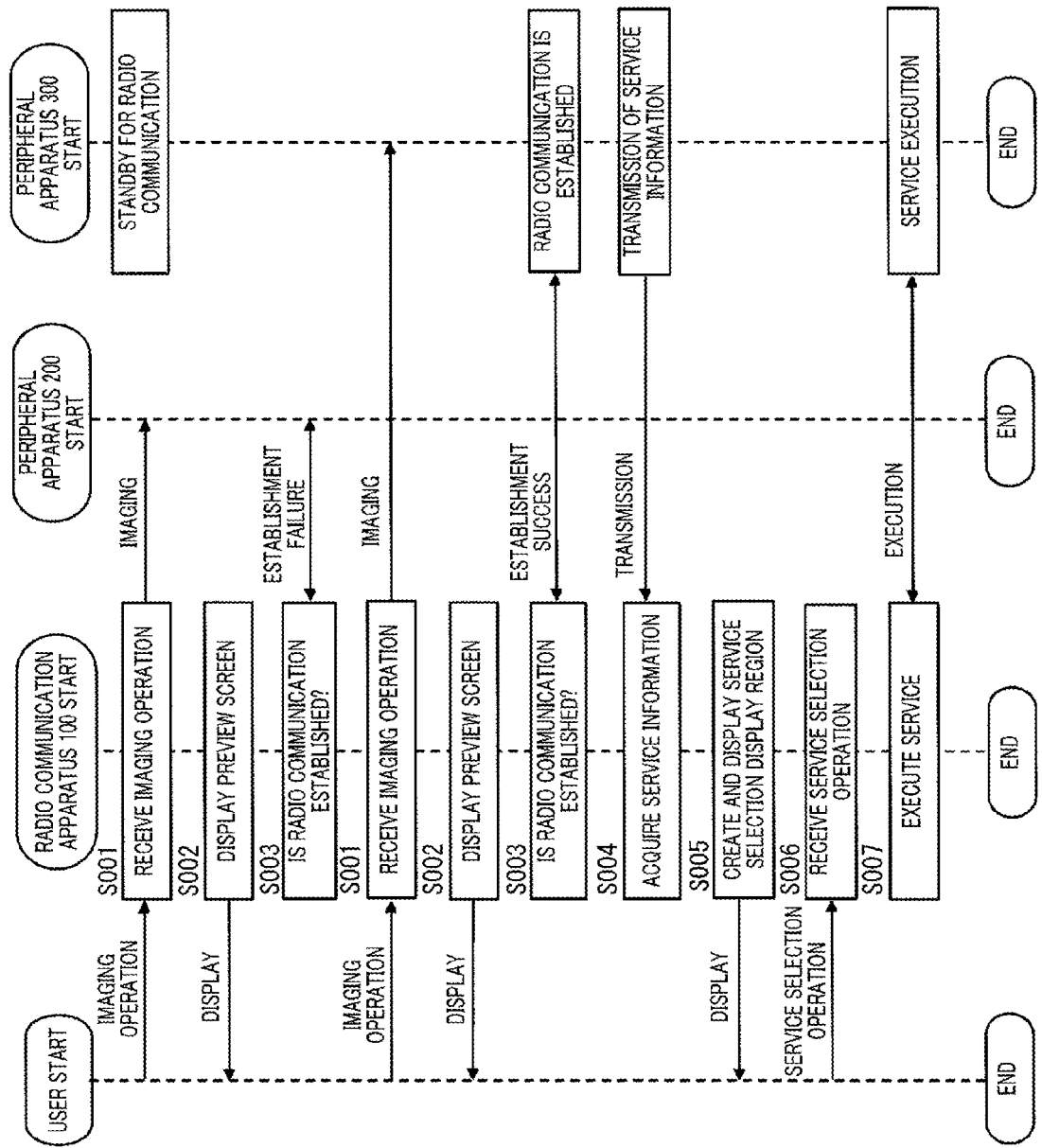
FIG. 8 is a sequence diagram illustrating an example of operations performed by the radio communication apparatus according to Embodiment 2.

FIG. 8 has been described above.

By such operations, with radio communication apparatus 100, the user captures an image of a peripheral apparatus in such a manner that the image falls within the preview screen and thus can intuitively select the peripheral apparatus as a communication counterpart, thereby attempting to establish radio communication. Further, with radio communication apparatus 100, the user captures the image of the peripheral apparatus in such a manner that the image falls within the preview screen and thus can intuitively maintain the established radio communication. Further, in radio communication apparatus 100, the user views the service selection display region and performs an operation to select a desired service and thus can intuitively select a service and a communication protocol which can be executed between the peripheral apparatus and radio communication apparatus 100.

The operations of radio communication apparatus 100 have been described so far.

As described above, a radio communication apparatus according to the present embodiment includes: a peripheral-area imaging section that captures an image of a peripheral area using an optical system, in a state where an LOS of radio communication for establishing highly directional radio communication is aligned to an optical axis of the optical system; a preview display section that displays on a preview screen another radio communication apparatus whose image has been captured as the peripheral image; and a communication establishing section that establishes the radio communication with the other radio communication apparatus displayed on the preview screen.

Accordingly, when radio communication apparatus 100 according to the present embodiment performs the highly directional radio communication with another radio communication apparatus, the user can clearly recognize the communicable range of the radio communication. As a result, the user can surely realize selection of the communication counterpart and maintenance of the established radio communication by an intuitive operation.

Embodiment 3

Embodiment 3 will be described. The present embodiment is different from Embodiment 2 in that when a plurality of communication protocols are prepared for one service, service execution section 170 preferentially selects a PAL protocol.

The following embodiments will be described using a specific example of a case where radio communication apparatus 100 and a peripheral apparatus prepare a plurality of communication protocols for the same service.

For example, it is assumed that "file transfer" as an available service and that two of the TCP/IP protocol and the SD protocol are associated as the communication protocol of the "file transfer" for radio communication apparatus 100 and peripheral apparatus 300. Here, a priority flag is given to the SD protocol in advance. The priority flag is a flag that serves as a reference for preferential selection of service execution section 170. In this manner, in the present embodiment, the priority flag is given to the PAL protocol in advance. In addition, the SD protocol is an example of the PAL protocol.

In this case, the user of radio communication apparatus 100 selects, for example, "downloading" of "file transfer" from the service selection display region, as illustrated in FIGS. 6A and 6B. This allows service execution section 170 to perform the "downloading" using the communication protocol prepared in association with the file transfer in advance. At this time, in the present embodiment, service execution section 170 preferentially selects PAL protocol with a priority flag from among two communication protocols prepared in association with the file transfer. In other words, service execution section 170 selects the SD protocol and executes the downloading using the protocol. Although the method by which service execution section 170 preferentially selects a communication protocol using the priority flag has been described, service execution section 170 may be programmed in advance to preferentially select the PAL protocol.

As described above, when the radio communication apparatus according to the present embodiment can select any one of a plurality of communication protocols associated with the same service, it is possible to select an efficient protocol, without making the user aware of the selection.

Embodiment 4

Embodiment 4 will be described. The present embodiment is different from Embodiment 2 in that, when a radio wave radiation angle is smaller than a view angle of an optical system, preview display section 120 displays a region guidance display region for making a peripheral apparatus fall within a range of the radio wave radiation angle, while overlapping the region guidance display region with a preview screen.

As illustrated using FIG. 5, in radio communication apparatus 100, in order for a peripheral apparatus to be within the line of sight, the peripheral apparatus needs to be within the range of the radio wave radiation angle 21. In other words, as illustrated in FIG. 5, let us consider a case where radio wave radiation angle 21 is smaller than view angle of the optical system 20. In this case, even if the peripheral apparatus falls within the preview screen, the peripheral apparatus is not in the line of sight unless the peripheral apparatus falls within the range of the radio wave radiation angle 21.

Figure 9:
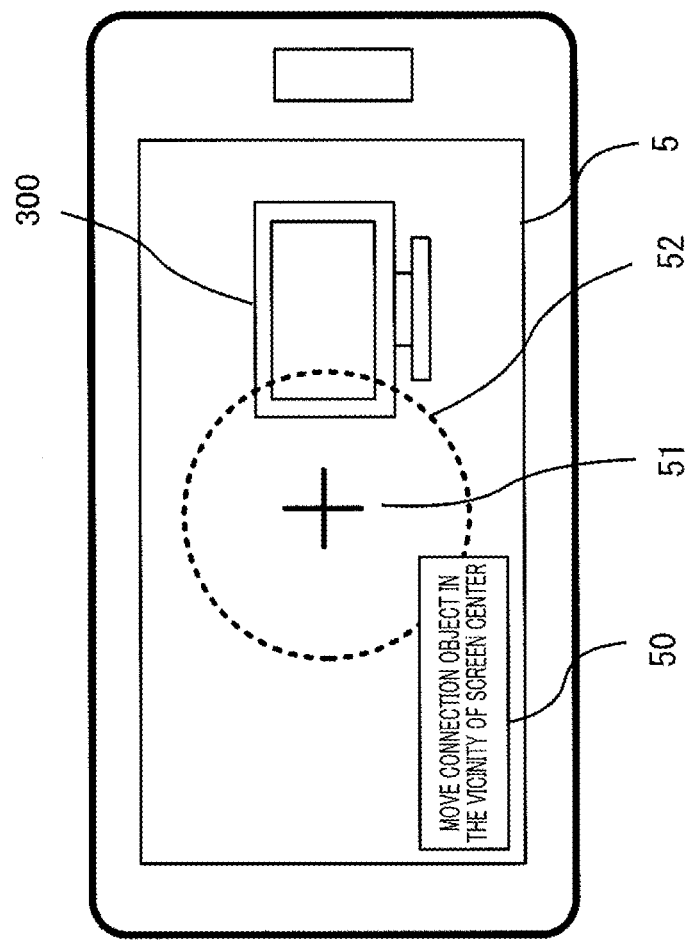
FIG. 9 is a diagram illustrating an example of a region guidance display region of a radio communication apparatus according to Embodiment 4.

Thus, in the present embodiment, preview display section 120 displays a region guidance display region while overlapping the region guidance display region with the preview screen. The region guidance display region is a display region for guiding the imaging operation performed by a user in such a manner that the image of the peripheral apparatus falls within the range of the radio wave radiation angle. FIG. 9 illustrates an example of the region guidance display region. In the example of FIG. 9, guide message 50 and center mark 51 as well as region guidance display region 52 of a circular shape are displayed on the preview screen.

The user performs the imaging operation according to guide message 50 so as to make peripheral apparatus 300 within the preview screen be disposed in the vicinity of center mark 51 and fall within region guidance display region 52. If peripheral apparatus 300 within the preview screen is disposed in the vicinity of center mark 51 and falls within region guidance display region 52, actual peripheral apparatus 300 falls within the range of the radio wave radiation angle.

In addition, rather than an entire peripheral apparatus, only an antenna section of the peripheral apparatus within the preview screen may be disposed in the vicinity of the center mark 51 and may fall within region guidance display region 52. For this reason, a mark indicating the antenna may be attached to, or an LED or the like may be lightened in the antenna section of the peripheral apparatus.

As described above, in the radio communication apparatus according to the present embodiment, the user can intuitively recognize a predetermined range on the preview screen within which the peripheral apparatus is to fall and thus can facilitate the establishment and the maintenance of the radio communication.

Embodiment 5

Embodiment 5 will be described. The present embodiment is different from Embodiment 4 in that, when a radio wave radiation angle is smaller than a view angle of an optical system, preview display section 120 zooms and displays a preview screen in order to adjust the view angle of the optical system to the radio wave radiation angle.

As described in Embodiment 4, in a case where the radio wave radiation angle is smaller than the view angle of the optical system, the peripheral apparatus is not necessarily within the line of sight. In order to solve this problem, the region guidance display region is displayed in Embodiment 4, but in contrast, displaying of the zoomed preview screen is performed instead of displaying of the region guidance display region in the present embodiment.

Figure 10:
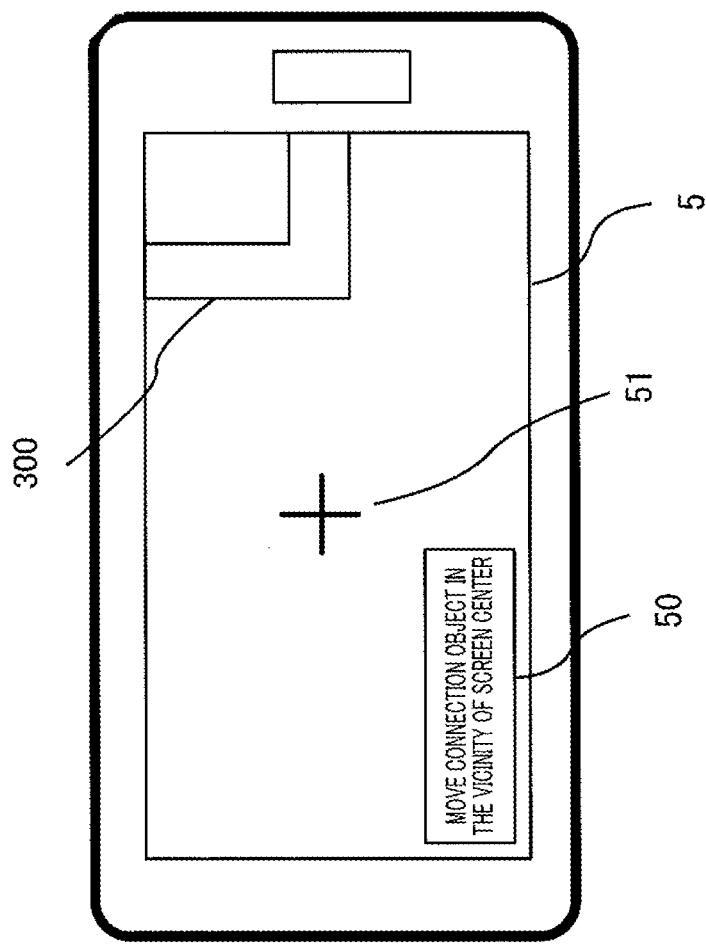
FIG. 10 is a diagram illustrating an example of a zoomed display screen of a radio communication apparatus according to Embodiment 5.

Preview display section 120 zooms and displays the preview screen in order to adjust the view angle of the optical system 20 illustrated in FIG. 5 to radio wave radiation angle 21. FIG. 10 illustrates an example of how a preview screen is zoomed and displayed. In the example of FIG. 10, by displaying the zoomed preview screen, on the right end of the preview screen, peripheral apparatus 300 is expanded and displayed. Further, in the example of FIG. 10, similar to FIG. 9, guide message 50 and center mark 51 are displayed.

The user performs an imaging operation according to guide message 50 in such a manner that peripheral apparatus 300 within the preview screen is located in the vicinity of center mark 51. If peripheral apparatus 300 within the preview screen is located in the vicinity of center mark 51, actual peripheral apparatus 300 falls within the range of the radio wave radiation angle.

As described above, in the radio communication apparatus according to the present embodiment, the user can intuitively recognize a predetermined range on the preview screen within which the peripheral apparatus falls and thus can facilitate the establishment and the maintenance of the radio communication.

Embodiment 6

Embodiment 6 will be described. The present embodiment is different from Embodiment 2 in that, when a plurality of peripheral apparatuses are displayed on a preview screen, a service selection display region is displayed in a position of a peripheral apparatus for which an object recognition is performed by image processing. Here, the object recognition is a technology that identifies the name of the object and a position in the image by extracting a characteristic amount of a shape of the object as a subject and comparing the extracted characteristic amount with the characteristic amount of the object registered in advance. In general, since object recognition of a three-dimensional shape does not have high recognition accuracy, the object recognition may be performed using a two-dimensional code called a marker in an auxiliary manner.

Figure 11:
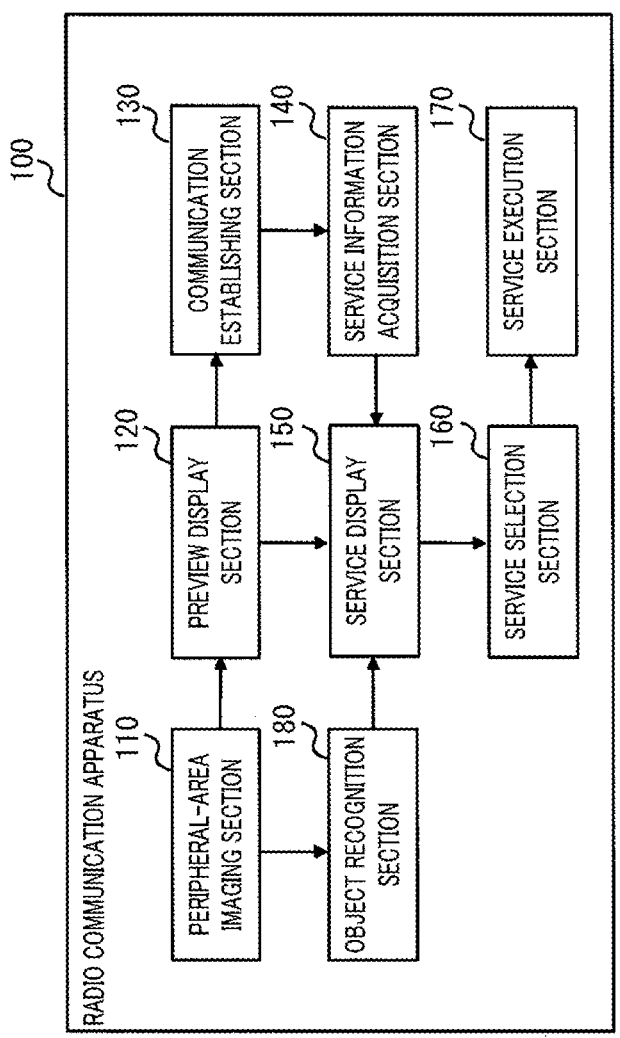
FIG. 11 is a block diagram illustrating a configuration example of functions realized by a radio communication apparatus according to Embodiment 6.

FIG. 11 is a diagram illustrating each function of radio communication apparatus 100 of the present embodiment. The configuration illustrated in FIG. 11 is different from the configuration illustrated in FIG. 4 in that object recognition section 180 is added. In addition, since each of sections other than object recognition section 180 is already described using FIG. 4, the descriptions thereof are omitted here.

Object recognition section 180 recognizes the shape of a peripheral apparatus as a subject or an image of a marker attached thereto, thereby identifying the peripheral apparatus. Service display section 150 displays, on the preview screen, the created service selection display region in an overlapped manner in the vicinity of the peripheral apparatus identified by object recognition section 180.

Figure 12:
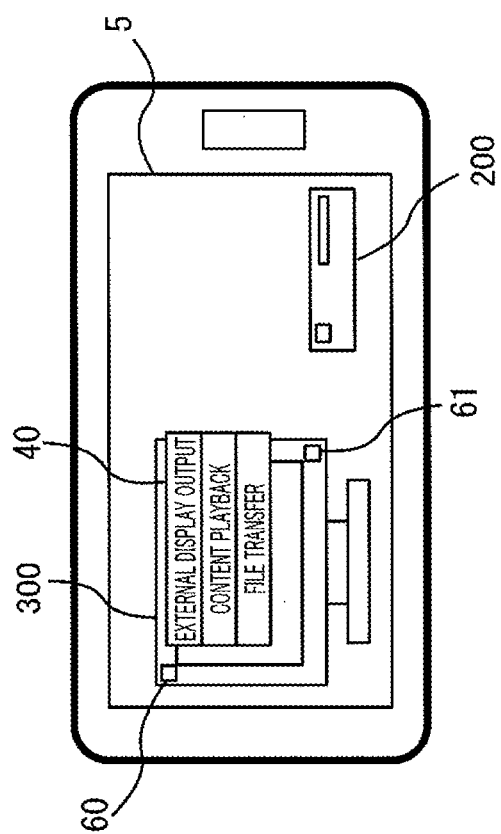
FIG. 12 is a diagram illustrating an example of a display screen when a service is selected in the radio communication apparatus according to Embodiment 6.

Here, the specific example of the present embodiment of a case of performing the object recognition using a marker will be described. For example, it is assumed that peripheral apparatus 200, illustrated in FIG. 5, is located in the vicinity of peripheral apparatus 300, and a marker is attached to peripheral apparatus 300. In order to select peripheral apparatus 300 as the communication counterpart, the user captures an image of peripheral apparatus 300 in such a manner that the image falls within the preview screen using radio communication apparatus 100. At this time, not only peripheral apparatus 300 but also peripheral apparatus 200 located in the vicinity thereof are displayed on the preview screen. Here, object recognition section 180 detects the marker with respect to peripheral apparatuses 200 and 300 as the subject. Then, object recognition section 180 recognizes the image of the marker attached to peripheral apparatus 300 and identifies peripheral apparatus 300 as the communication counterpart. Further, object recognition section 180 identifies the position of the marker is recognized by the image. Thereafter, radio communication is established between radio communication apparatus 100 and peripheral apparatus 300. Service display section 150 creates a service selection display region based on the service information received from peripheral apparatus 300. Here, service display section 150 displays the service selection display region in the vicinity of the marker attached to peripheral apparatus 300 identified by object recognition section 180. FIG. 12 illustrates an example of how a preview screen is displayed at this time. In FIG. 12, on the preview screen, peripheral apparatus 300 is displayed on the left side and peripheral apparatus 200 is displayed on the right side. Further, markers 60 and 61 recognized by object recognition section 180 are attached to peripheral apparatus 300. Then, service selection display 40 is displayed in the vicinity of the markers 60 and 61 attached to peripheral apparatus 300.

As described above, the radio communication apparatus according to the present embodiment can display the service selection display in the position of the peripheral apparatus as the subject, even when a plurality of peripheral apparatuses are present within the preview screen. Therefore, the user can easily recognize a peripheral apparatus with which the radio communication is established and services executable between peripheral apparatus 300 and the radio communication apparatus.

In addition, in the present embodiment, only when apparatus position identification section 170 identifies a peripheral apparatus within the preview screen, communication establishing section 130 may attempt to establish radio communication with the peripheral apparatus. As a result, the radio communication apparatus according to the present embodiment can prevent increases in the number of attempts to establish radio communication with peripheral apparatuses other than the target peripheral apparatus and achieve power saving.

Although some embodiments of the present invention have been described above, the above description is merely an example and various modifications are possible. Hereinafter, variations will be described.

Although a smartphone or a tablet is used as the application example of radio communication apparatus 100 in the description of each of the embodiments, radio communication apparatus 100 is not limited thereto, and may be, for example, personal computers, television receivers, e-book terminals, music players, game machines, or the like, of a portable type.

Although the foregoing embodiments have been described for the example of hardware implementation of the present invention, the present invention can be implemented with software, in concert with hardware.

A radio communication apparatus according to this disclosure includes: a peripheral-area imaging section that captures an image of a peripheral area using an optical system in a state where a line of sight of radio communication for establishing highly directional radio communication is aligned to an optical axis of the optical system; a preview display section that displays, on a preview screen, another radio communication apparatus whose image has been captured as an image of the peripheral area; and a communication establishing section that establishes the radio communication with the other radio communication apparatus displayed on the preview screen.

The radio communication apparatus according to the disclosure further includes: a service information acquisition section that acquires service information indicating a service executable by the other radio communication apparatus, from the other radio communication apparatus with which the radio communication has been established; a service display section that creates and displays, based on the service information, a service selection display region for allowing a user to select a service executable between the radio communication apparatus and the other radio communication apparatus; and a service selection section that receives a service selection operation performed by the user to select a desired service in the service selection display region.

The radio communication apparatus according to the disclosure further includes a service execution section that executes a service selected by the service selection operation, using a communication protocol associated in advance with the service between the radio communication apparatus and the other radio communication apparatus with which the radio communication has been established.

In the radio communication apparatus according to the disclosure, the service display section displays the service selection display region while overlapping the service selection display region with the preview screen on which the other radio communication apparatus is displayed.

In the radio communication apparatus according to the disclosure, when a plurality of communication protocols are associated in advance with the service selected by the service selection operation, the service execution section preferentially selects a protocol adaptation layer (PAL) protocol from among the plurality of communication protocols and executes the service using the PAL protocol.

In the radio communication apparatus according to the disclosure, when a radio wave radiation angle of the radio communication is smaller than a view angle of the optical system, the preview display section overlaps a region guidance display region for causing the other radio communication apparatus to fall within a range of the radio wave radiation angle in the preview screen.

In the radio communication apparatus according to the disclosure, when a radio wave radiation angle of the radio communication is smaller than a view angle of the optical system, the preview display section zooms and displays the preview screen in order to match the view angle of the optical system with the radio wave radiation angle.

The radio communication apparatus according to the disclosure further includes an object recognition section that identifies a kind and a position of the other radio communication apparatus within the preview screen by performing an object recognition of the other radio communication apparatus, in which the service display section displays the service selection display region in an overlapped manner according to the position of the other radio communication apparatus identified within the preview screen.

In the radio communication apparatus according to the disclosure, the communication establishing section attempts to establish the radio communication with the other radio communication apparatus, only when the object recognition section identifies the position of the other radio communication apparatus within the preview screen.

A radio communication method according to the disclosure includes: capturing an image of a peripheral area using an optical system in a state where a line of sight of radio communication for establishing highly directional radio communication is aligned to an optical axis of the optical system; displaying, on a preview screen, a different radio communication apparatus whose image has been captured as an image of the peripheral area; and establishing the radio communication with the other radio communication apparatus displayed on the preview screen.

A radio communication control program according to the disclosure causes a computer of a radio communication apparatus to execute processes including: capturing an image of a peripheral area using an optical system in a state where a line of sight of radio communication for establishing highly directional radio communication is aligned to an optical axis of the optical system; displaying, on a preview screen, another radio communication apparatus whose image has been captured as an image of the peripheral area; and establishing the radio communication with the other radio communication apparatus displayed on the preview screen.

The disclosure of Japanese Patent Application No. 2012-054276, filed on Mar. 12, 2012, including the specification, drawings, and abstract, is incorporated herein by reference in its entirety.

INDUSTRIAL APPLICABILITY

The present invention is useful as a radio communication apparatus, a radio communication method, and a radio communication control program, which can perform transmission and reception of data with another radio communication apparatus. The present invention is applicable to, for example, a mobile apparatus such as a mobile phone and a tablet, and a personal computer.

REFERENCE SIGNS LIST

100 Radio communication apparatus
110 Peripheral-area imaging section
120 Preview display section
130 Communication establishing section
140 Service information acquisition section
150 Service display section
160 Service selection section
170 Service execution section
180 Object recognition section
200, 300 Peripheral apparatus

The invention claimed is:

1. A radio communication apparatus, comprising:
a peripheral-area imaging section that captures an image of a peripheral area using an optical system in a state where a line of sight of radio communication for establishing highly directional radio communication is aligned to an optical axis of the optical system;
a preview display section that displays, on a preview screen, another radio communication apparatus whose image has been captured as an image of the peripheral area;
a communication establishing section that establishes the radio communication with the other radio communication apparatus displayed on the preview screen;
a service information acquisition section that acquires service information indicating a service executable by the other radio communication apparatus, from the other radio communication apparatus with which the radio communication has been established;
a service display section that creates and displays, based on the service information, a service selection display region for allowing a user to select a service executable between the radio communication apparatus and the other radio communication apparatus; and
a service selection section that receives a service selection operation performed by the user to select a desired service in the service selection display region.

2. The radio communication apparatus according to claim 1, further comprising a service execution section that executes a service selected by the service selection operation, using a communication protocol associated in advance with the service between the radio communication apparatus and the other radio communication apparatus with which the radio communication has been established.

3. The radio communication apparatus according to claim 2, wherein, when a plurality of communication protocols are associated in advance with the service selected by the service selection operation, the service execution section preferentially selects a protocol adaptation layer (PAL) protocol from among the plurality of communication protocols and executes the service using the PAL protocol.

4. The radio communication apparatus according to claim 1, wherein the service display section displays the service selection display region while overlapping the service selection display region with the preview screen on which the other radio communication apparatus is displayed.

5. The radio communication apparatus according to claim 1, wherein, when a radio wave radiation angle of the radio communication is smaller than a view angle of the optical system, the preview display section overlaps a region guidance display region for causing the other radio communication apparatus to fall within a range of the radio wave radiation angle in the preview screen.

6. The radio communication apparatus according to claim 1, wherein, when a radio wave radiation angle of the radio communication is smaller than a view angle of the optical system, the preview display section zooms and displays the preview screen in order to match the view angle of the optical system with the radio wave radiation angle.

7. The radio communication apparatus according to claim 1, further comprising an object recognition section that identifies a kind and a position of the other radio communication apparatus within the preview screen by performing an object recognition of the other radio communication apparatus, wherein
the service display section displays the service selection display region in an overlapped manner according to the position of the other radio communication apparatus identified within the preview screen.

8. The radio communication apparatus according to claim 7, wherein the communication establishing section attempts to establish the radio communication with the other radio communication apparatus, only when the object recognition section identifies the position of the other radio communication apparatus within the preview screen.

9. A radio communication method comprising:
capturing an image of a peripheral area using an optical system in a state where a line of sight of radio communication for establishing highly directional radio communication is aligned to an optical axis of the optical system;
displaying, on a preview screen, another radio communication apparatus whose image has been captured as an image of the peripheral area;
establishing the radio communication with the other radio communication apparatus displayed on the preview screen;
acquiring service information indicating a service executable by the other radio communication apparatus, from the other radio communication apparatus with which the radio communication has been established;
creating and displaying, based on the service information, a service selection display region for allowing a user to select a service executable between the radio communication apparatus and the other radio communication apparatus; and
a service selection section that receives a service selection operation performed by the user to select a desired service in the service selection display region.

10. A non-transitory radio communication control program causing a computer of a radio communication apparatus to execute processes comprising:
capturing an image of a peripheral area using an optical system in a state where a line of sight of radio communication for establishing highly directional radio communication is aligned to an optical axis of the optical system;
displaying, on a preview screen, another radio communication apparatus whose image has been captured as an image of the peripheral area;
establishing the radio communication with the other radio communication apparatus displayed on the preview screen;
acquiring service information indicating a service executable by the other radio communication apparatus, from the other radio communication apparatus with which the radio communication has been established;
creating and displaying, based on the service information, a service selection display region for allowing a user to select a service executable between the radio communication apparatus and the other radio communication apparatus; and
a service selection section that receives a service selection operation performed by the user to select a desired service in the service selection display region.

* * * * *